US010695943B2

(12) United States Patent
Kachi et al.

(10) Patent No.: US 10,695,943 B2
(45) Date of Patent: Jun. 30, 2020

(54) CHAINSAW

(71) Applicant: MAKITA CORPORATION, Anjo, Aichi (JP)

(72) Inventors: Hideki Kachi, Aichi (JP); Koji Haneda, Aichi (JP); Tsunahisa Nakamura, Aichi (JP)

(73) Assignee: MAKITA CORPORATION, Anjo, Aichi (JP)

( * ) Notice: Subject to any disclaimer, the term of this patent is extended or adjusted under 35 U.S.C. 154(b) by 23 days.

(21) Appl. No.: 15/742,565

(22) PCT Filed: Jul. 7, 2016

(86) PCT No.: PCT/JP2016/070178
§ 371 (c)(1),
(2) Date: Jan. 8, 2018

(87) PCT Pub. No.: WO2017/010408
PCT Pub. Date: Jan. 19, 2017

(65) Prior Publication Data
US 2018/0200917 A1    Jul. 19, 2018

(30) Foreign Application Priority Data
Jul. 13, 2015 (JP) .................... 2015-139810

(51) Int. Cl.
*B27G 19/00* (2006.01)
*B27B 17/02* (2006.01)
(Continued)

(52) U.S. Cl.
CPC ........ *B27G 19/003* (2013.01); *B27B 17/0008* (2013.01); *B27B 17/02* (2013.01); *F16P 3/20* (2013.01)

(58) Field of Classification Search
CPC ..... B27G 19/003; B27B 17/008; B27B 17/02; F16P 3/20
(Continued)

(56) References Cited

U.S. PATENT DOCUMENTS 4,432,139 A    2/1984 Köhler et al.
4,449,062 A *  5/1984 Wilson ................ A01D 34/828
                                                                200/83 Z
(Continued)

FOREIGN PATENT DOCUMENTS

CN    1596170 A    3/2005
CN    101817177 A   9/2010
(Continued)

OTHER PUBLICATIONS

Communication dated Sep. 24, 2019, from the State Intellectual Property Office of the P.R. of China in counterpart Application No. 201680031094.6.

(Continued)

*Primary Examiner* — Hwei-Siu C Payer
(74) *Attorney, Agent, or Firm* — Sughrue Mion, PLLC

(57) ABSTRACT

A chainsaw includes a handle with a handgrip; an electric motor for endlessly moving a saw chain; a control unit for controlling rotation of the motor; and a main power switch switchable between an ON state and an OFF state. The handgrip is provided with a gripping detection device for detecting whether the handgrip is gripped by the worker, and the chainsaw is configured to, when the control unit is manipulated to deactivate the electric motor in a state in which the gripping detection device detects that the handgrip is gripped, maintain the main power switch in the ON state, and to, when the control unit is manipulated to deactivate the electric motor in a state in which the gripping detection
(Continued)

device detects that the handgrip is not gripped, switch the main power switch to the OFF state.

10 Claims, 5 Drawing Sheets

(51) Int. Cl.
   *B27B 17/00* (2006.01)
   *F16P 3/20* (2006.01)
(58) Field of Classification Search
   USPC .................................................. 30/381–383
   See application file for complete search history.

(56) References Cited

U.S. PATENT DOCUMENTS

| | | | |
|---|---|---|---|
| 4,680,862 A | 7/1987 | Wieland et al. | |
| 6,415,516 B1 * | 7/2002 | Tirado | B27B 17/0008 30/381 |
| 8,935,856 B2 * | 1/2015 | Tsuruoka | B27B 17/00 30/381 |
| 2009/0119933 A1 * | 5/2009 | Mace | A01G 3/08 30/381 |
| 2010/0218966 A1 | 9/2010 | Liebhard et al. | |
| 2010/0313430 A1 * | 12/2010 | Yamaoka | A01D 34/828 30/276 |
| 2011/0005088 A1 * | 1/2011 | Pellenc | B27B 17/0008 30/383 |
| 2011/0072671 A1 * | 3/2011 | Tsuruoka | B27B 17/00 30/383 |
| 2011/0146610 A1 | 6/2011 | Reichler et al. | |
| 2012/0110863 A1 * | 5/2012 | Brown | A01G 3/086 30/371 |
| 2013/0019482 A1 * | 1/2013 | Yamaoka | A01G 3/037 30/266 |
| 2014/0165946 A1 | 6/2014 | Yanagihara et al. | |
| 2015/0027742 A1 * | 1/2015 | Svennung | B25F 5/00 173/20 |
| 2018/0084731 A1 * | 3/2018 | Harris | A01G 3/086 |
| 2018/0200917 A1 * | 7/2018 | Kachi | B27B 17/0008 |

FOREIGN PATENT DOCUMENTS

| | | |
|---|---|---|
| CN | 102107425 A | 6/2011 |
| CN | 102554347 A | 7/2012 |
| CN | 103858585 A | 6/2014 |
| EP | 2 286 970 A1 * | 2/2011 |
| JP | 55-102729 A | 8/1980 |
| JP | 62-055102 A | 3/1987 |
| JP | 7-47504 * | 2/1995 |
| JP | 07-047504 A | 2/1995 |
| JP | 2001-092574 A | 4/2001 |
| JP | 2011-507728 A | 3/2011 |
| JP | 2015-074193 A | 4/2015 |
| WO | 2003/057395 A1 | 7/2003 |
| WO | WO 2018/166904 A1 * | 9/2018 |

OTHER PUBLICATIONS

Communication dated Jan. 29, 2019, from the Japanese Patent Office in counterpart application No. 2015-139810.
Communication dated Mar. 19, 2019, from the State Intellectual Property Office of People's Republic of China in counterpart Application No. 201680031094.6.
International Search Report of PCT/JP2016/070178 dated Oct. 4, 2016 [PCT/ISA/210].

* cited by examiner

CHAINSAW

TECHNICAL FIELD

The present invention relates to a chainsaw having a saw chain configured to be driven and endlessly moved by an electric motor, and more specifically to a chainsaw equipped with a gripping detection device that is provided in a handgrip of a handle to detect whether the handgrip is gripped by a worker.

BACKGROUND ART

An electric motor-driven-type chainsaw having a saw chain configured to be driven and endlessly moved by an electric motor is known in the technical field of chainsaws. For example, JP 2015-074193 A discloses a chainsaw comprising an electric motor provided inside a housing, a guide bar, and a guide chain. The guide bar is provided in a front portion of the housing and protrudes forwardly therefrom. The saw chain is provided around an outer periphery of the guide bar in a tensioned state and is configured to be driven and endlessly moved by the electric motor. In this chainsaw, in a state in which the saw chain driven by the electric motor is endlessly moved along the outer periphery of the guide bar, the endlessly moved saw chain can be pressed against lumber or the like to cut the lumber or the like. This disclosed chainsaw comprises a side handle provided on a central portion of the housing, and a rear handle provided on a rear portion of the housing. A worker can carry out work of cutting lumber or the like while gripping both a handgrip in an upper portion of the side handle and a handgrip in an upper portion of the rear handle, for example, by using the worker's left hand and right hand, respectively. A trigger lever is swingably provided on a lower surface of the upper portion of the rear handle. The electric motor is configured to be activated by pulling the trigger lever toward the handgrip so as to perform a manipulation to an ON state.

SUMMARY OF INVENTION

Problem to be Solved by Invention

In the prior art chainsaw, when a worker grips the handgrip of the rear handle, he/she can unintentionally pull the trigger lever by using his/her fingers to grip the handgrip. This may cause unintended activation of the electric motor, leading to a situation where the saw chain is endlessly moved unintendedly. In order to eliminate this possibility, it is possible to provide a main power switch for switching between an ON state for enabling electric power feeding from an electric power supply to the electric motor, and an OFF state for disabling the electric power feeding. The chainsaw may be configured such that the electric motor can be activated by pulling the trigger lever only when the main power switch is in the ON state, whereby it is possible to prevent the situation where the saw chain is endlessly moved unintendedly due to unintended activation of the electric motor. In this configuration, the main power switch is maintained in the ON state when a worker disengages his/her hand from the handgrip of the rear handle to finish work. Thus, considering that the trigger lever might be unintendedly pulled by fingers of the hand when the worker re-grips the handgrip of the rear handle, or might be pulled by a third person who is unaware that the main power switch is in the ON state, there remains a possibility that the electric motor is unintendedly activated. In order to eliminate this possibility, it is possible to employ an interlocking device that enables the main power switch to be automatically switched to the OFF state in an interlocking manner by loosening the worker's fingers pulling the trigger lever to deactivate the electric motor, whereby, even if the worker unintendedly pulls the trigger lever when he/she re-grips the handgrip of the rear handle, it is possible to prevent the electric motor from being activated to cause the chainsaw to be endlessly moved. However, there are some cases where, during a period in which a worker carries out work while pulling the trigger lever, he/she temporarily releases the trigger lever from a pulled state to temporarily deactivate the electric motor. If the main power switch is automatically switched to the OFF state in an interlocking manner, every time the trigger lever is temporarily returned to temporarily deactivate the electric motor, it is necessary to switch the main power switch to the ON state in advance when the worker intends to re-pull the trigger lever. Thus, there is a problem that the chainsaw is difficult to use. It is an object of the present invention to provide a chainsaw capable of preventing a main power switch from being switched from an ON state to an OFF state, during a period in which a user keeps gripping a handgrip. The chainsaw is easier to use, but still enables the main power switch to be automatically switched to the OFF state when a worker releases the handgrip, thereby achieving an improvement in safety.

DISCLOSURE OF INVENTION

In order to achieve the above object, one aspect of the present invention provides a chainsaw comprising: a housing; a handle which has a handgrip to be gripped by a worker using the chainsaw and which is coupled to the housing; a guide bar formed in an elongate plate-like shape having an outer periphery and coupled to the housing in such a manner as to protrude forwardly from the housing; a saw chain slidably provided around the outer periphery of the guide bar in such a manner as to be endlessly moved along the outer periphery; an electric motor provided inside the housing and operable to endlessly move a saw chain; a main power switch provided electrically between an electric power supply and the electric motor and switchable between an ON state for enabling electric power feeding from the electric power supply to the electric motor, and an OFF state for disabling the electric power feeding; and a control unit for controlling the electric power feeding from the electric power supply to the electric motor in a state in which the main power switch is switched to the ON state, to thereby control rotation of the electric motor. The chainsaw further comprises a gripping detection device provided in the handgrip and operable to detect whether or not the handgrip is gripped by the worker.

The chainsaw configured in this way is provided with the gripping detection device operable to detect whether or not the handgrip is gripped by the worker, so that it is possible to immediately discriminate whether or not the chainsaw is being used by the worker.

Preferably, the chainsaw of this aspect of the present invention further comprises an interlocking device provided in association with the electric motor, the main power switch, the control unit and the gripping detection device, wherein the interlocking device is configured to, when the control unit is manipulated to stop the rotation of the electric motor in a state in which the gripping detection device detects that the handgrip is gripped by the worker, maintain the ON state of the main power switch, and to, when the control unit is manipulated to strop the rotation of the electric motor in a state in which the gripping detection device detects that the handgrip is not gripped by the worker, switch the ON state of the main power switch to the OFF state thereof.

In the chainsaw configured in this way, when the worker disengages his/her hand from the handgrip to finish work, after the worker manipulates the control unit so as to activate the electric motor, while gripping the handgrip, the gripping detection device detects that the handgrip is not gripped by the worker, and then the interlocking device switches the ON state of the main power switch to the OFF state thereof. Therefore, even in a situation where the control unit is unintendedly manipulated when the worker re-grips the handgrip, the electric motor is never activated, so that it is possible to enhance safety of the chainsaw. On the other hand, even when the control unit is manipulated to temporarily deactivate the electric motor, in a state in which the worker grips the handgrip, the gripping detection device detects that the handgrip is gripped by the worker, and therefore the interlocking device maintains the ON state of the main power switch. Thus, the electric motor can be re-activated by manipulating only the control unit, without a need for the worker to switch the main power switch to the ON state, again. This prevents deterioration in usability of the chainsaw.

Preferably, in the chainsaw configured as above, the handle includes a first handle having a first handgrip to be gripped by one hand of the worker of the chainsaw, and a second handle having a second handgrip to be gripped by the other hand of the worker of the chainsaw, wherein the first handgrip is provided with a first gripping detection device operable to detect whether or not the first handgrip is gripped by the worker, and the second first handgrip is provided with a second gripping detection device operable to detect whether or not the second handgrip is gripped by the worker, and wherein the interlocking device is configured to, when the control unit is manipulated to stop the rotation of the electric motor in a state in which each of the first gripping detection device and the second gripping detection device detects that a corresponding one of the first handgrip and the second handgrip is gripped by the worker, maintain the main power switch in the ON state, and to, when the control unit is manipulated to strop the rotation of the electric motor in a state in which at least one of the first gripping detection device and the second gripping detection device detects that a corresponding one of the first handgrip and the second handgrip is not gripped by the worker, switch the main power switch to the OFF state.

In the chainsaw configured in this way, unless the worker grips both of the first handgrip and the second handgrip, respectively, with his/her right and left hands, when the control unit is manipulated once to deactivate the electric motor, the subsequent manipulation of the control unit never gives rise to activation of the electric motor. This effectively prompts the worker to grip both of the first handgrip and the second handgrip with the both hands, so that it is possible to enhance safety of the chainsaw during use.

In the chainsaw of another aspect of the present invention, the gripping detection device may comprise: a gripping detection member configured to be protruded from the handgrip to take a ungripped position when the handgrip is not gripped by the worker, and to be retracted inside the handgrip to take a gripped position when the handgrip is gripped by the worker; and a position detector operable to detect whether the gripping detection member is located at the ungripped position or at the gripped position, wherein the gripping detection device may be configured to detect whether or not the handgrip is gripped by the worker, depending on whether the position detector detects that the gripping detection member is located at the gripped position or that the gripping detection member is located at the ungripped position.

Alternatively, in the chainsaw of another aspect of the present invention, the gripping detection device may comprise a transmitter provided in one of the handgrip and an worn article worn on a hand of the worker, and a receiver provided in the remaining one of the handgrip and the worn article, wherein the receiver is capable of receiving a signal transmitted from the transmitter, when the worker grips the handgrip, and wherein the gripping detection device may be configured to detect whether or not the handgrip is gripped by the worker, depending on whether or not the receiver has received the signal transmitted from the transmitter.

Alternatively, in the chainsaw of another aspect of the present invention, the gripping detection device may comprise a light detector provided in the handgrip and operable to detect light from surroundings, wherein the light detector is operable to detect whether or not the light detector is covered by a hand of the worker to thereby cause light from the surroundings to be blocked, and wherein the gripping detection device may be configured to detect whether or not the handgrip is gripped by the worker, depending on whether or not light from the surroundings has been blocked.

Alternatively, in the chainsaw of another aspect of the present invention, the gripping detection device may comprise a pressure-sensitive detector provided in the handgrip and operable to detect a change in pressure applied to the handgrip when the handgrip is gripped by the worker, wherein the gripping detection device may be configured to detect whether or not the handgrip is gripped by the worker, depending on whether or not the pressure-sensitive detector has detected the pressure change.

DETAILED DESCRIPTION OF EMBODIMENTS

With reference to the drawings, a chainsaw of the present invention will now be described with reference to the respective embodiments.

First Embodiment

Figure 1:
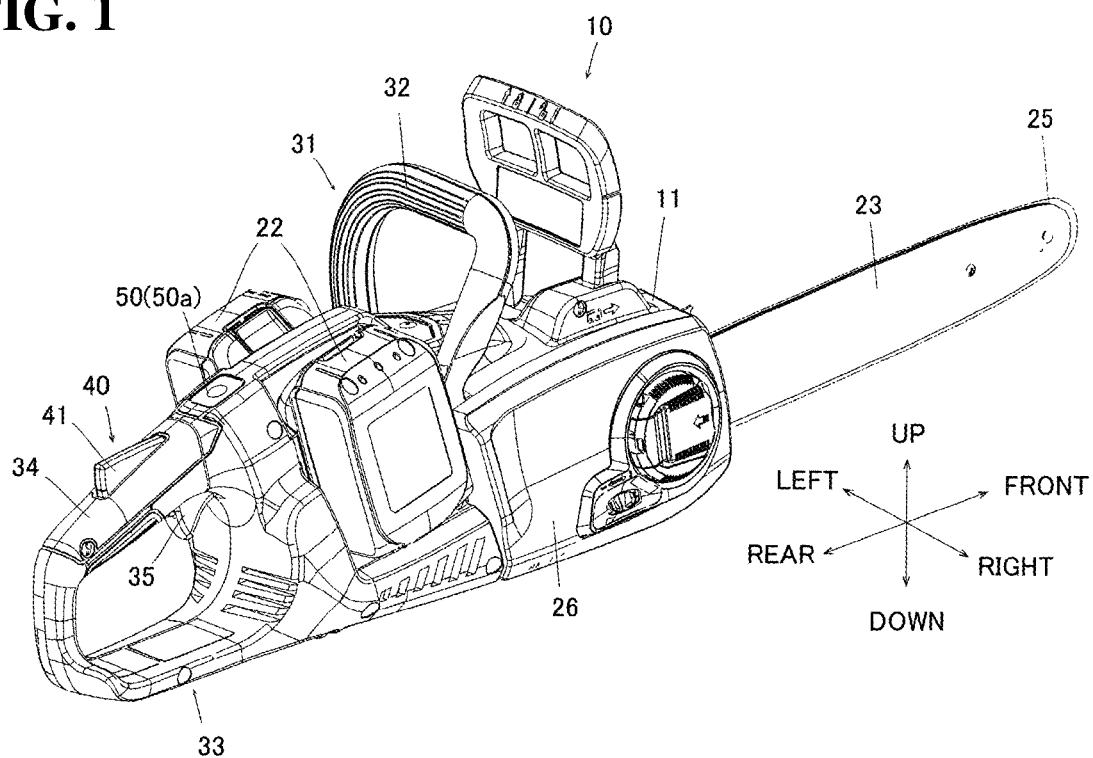
FIG. 1 is a perspective view depicting a general appearance of a chainsaw according to a first embodiment of the present invention, when viewed from a rear and right side.
Figure 2:
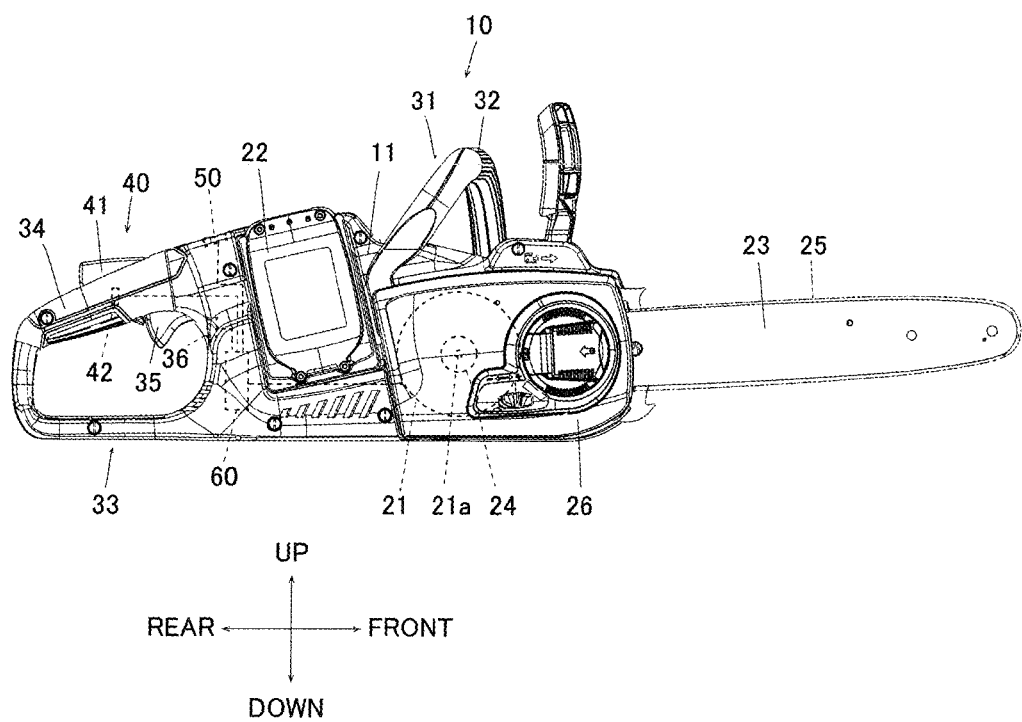
FIG. 2 is a right side view of a chainsaw in FIG. 1.

FIG. 1 and FIG. 2 depict a chainsaw according to a first embodiment of the present invention. The chainsaw 10 according to the first embodiment comprises a housing 11, an electric motor 21 housed in a front portion of the housing 11, and a battery pack 22 detachably attached to a rear portion of the housing 11 and usable as an electric power supply of the electric motor 21. An elongate plate-like shaped guide bar 23 is coupled to a front region of a right lateral wall of the housing 11 in such a manner as to extend forwardly from the housing 11, and a drive shaft 21a rotatable according to operation of the electric motor 21 is protruded on a rear side of the guide bar 23, and a procket 24 is fixed to the drive shaft 21a. A saw chain 25 is provided in a tensioned state around and between the sprocket 24 and an outer periphery of the guide bar 23 in an endlessly movable manner. The saw chain 25 is configured to run along the outer periphery of the guide bar 23, while being driven by the sprocket 24 rotated according to the electric motor 21. Further, the front region of the right lateral wall is provided with a sprocket cover 26 which covers the drive shaft 21a of the electric motor 21, the sprocket 24 and a rear end of the guide bar 23.

As depicted in FIG. 1 and FIG. 2, a side handle (front handle) 31 is provided on an intermediate portion of the housing 11 in a forward-rearward (longitudinal) direction, and a rear handle 33 is integrally coupled to the rear portion of the housing 11. The side handle 31 is formed in an upside-down approximately-J shape, and attached to stride between a right-side area of an upper wall of the housing 11 and a lower-side area of a left lateral wall of the housing 11, wherein it has, just above the housing 11, an upper horizontal portion forming a handgrip 32 to be gripped by a worker. The rear handle 33 is formed in a laterally-opened approximately U shape fell such that a rear end thereof is closed, wherein it has an upper leg portion forming a handgrip 34 to be gripped by a worker.

Figure 3A:
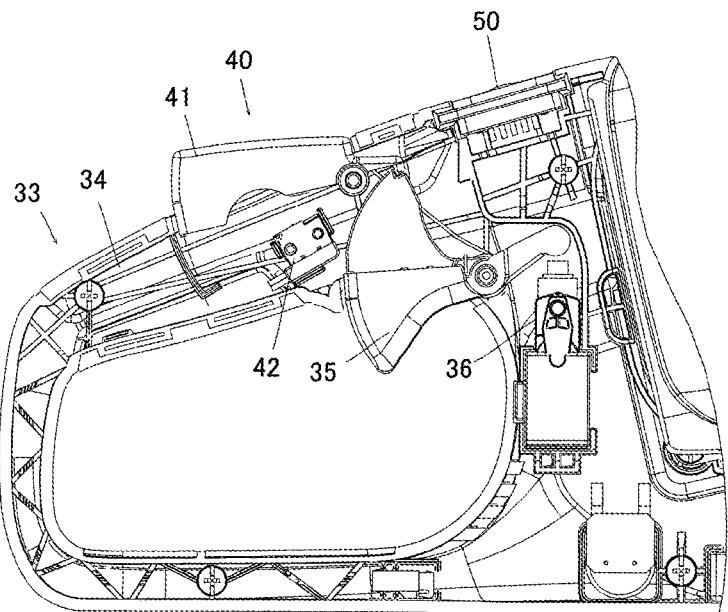
FIG. 3a is an exploded view depicting an internal structure of a rear section of the chainsaw including a rear portion of housing and a rear handle, in a state in which a gripping detection lever is located at an ungripped position.
Figure 3B:
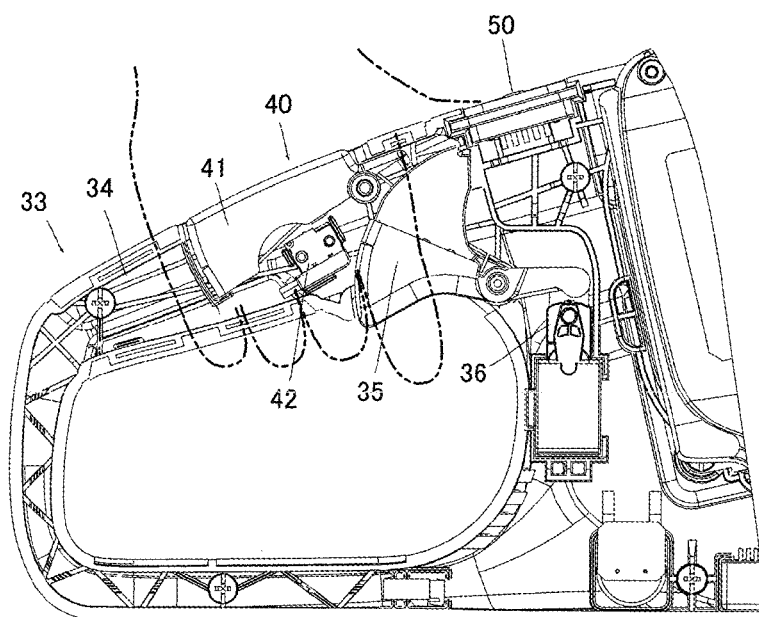
FIG. 3b is an exploded view depicting the internal structure of the rear section of the chainsaw including the rear portion of housing and the rear handle, in a state in which the gripping detection lever is located at a gripped position.
Figure 3B:
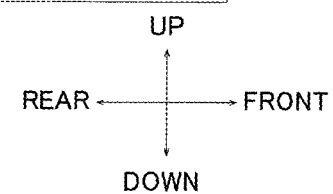

As depicted in FIG. 3a and FIG. 3b, a trigger lever 35 serving as a manipulatable element of a control unit for controlling a rotation output of the electric motor 21 is provided in a lower wall of a front portion of the handgrip 34 of the rear handle 33 at a position adjacent to a boundary with the rear portion of the housing 11, in such a manner as to be swingable about a horizontal axis extending in a rightward-leftward (lateral) direction. The rear portion of the housing 11 is provided with a control signal generator 36 for outputting a control signal according to a manipulation amount of the trigger lever 35. The control signal generator 36 is operable to output, to an aftermentioned interlocking device 60, a control signal according to a swinging angle of the trigger lever 35. When the trigger lever 35 is protruded downwardly and located at a position farthest away from the handgrip 34, the control signal generator 36 outputs an OFF signal to the aftermentioned interlocking device 60, without being driven by the trigger lever 35, and thus the aftermentioned interlocking device 60 controls the electric motor 21 such that it is kept from being activated. When the trigger lever 35 is swung upwardly toward the handgrip 34, the control signal generator 36 outputs, to the aftermentioned interlocking device 60, a control signal according to the swinging angle of the trigger lever 35, and thus the aftermentioned interlocking device 60 causes the electric motor 21 to rotate such that it is rotated in an output according to the control signal from the control signal generator 36.

Further, as depicted in FIG. 3a and FIG. 3b, the handgrip 34 of the rear handle 33 is provided with a gripping detection device 40 for detecting whether or not a worker grips the handgrip 34. Thus, as a result of detection by the gripping detection device 40, it is possible to detect whether the handgrip 34 is gripped by a worker, i.e., the chainsaw 10 is in a use state, or the handgrip 34 is not gripped by a worker, i.e., the chainsaw 10 is in a non-use state. The gripping detection device 40 comprises a gripping detection lever (gripping detection member) 41 swingably provided in a longitudinally intermediate position of the handgrip 34. The gripping detection lever 41 is supported on an upper wall of the longitudinally intermediate position of the handgrip 34, in such a manner as to be swingable between an ungripped position (depicted in FIG. 3a) where it is protruded upwardly from the handgrip 34, and a gripped position (depicted in FIG. 3b) where it is retracted inside the handgrip 34. The gripping detection lever 41 is biased by a biasing member (depiction is omitted) such as a spring, such that it is normally protruded to the ungripped position. When a worker does not grip the handgrip 34 of the rear handle 33, the gripping detection lever 41 is protruded upward of the handgrip 34 by a biasing force of the biasing member to take the ungripped position, and, when a worker grips the handgrip 34 of the rear handle 33, the gripping detection lever 41 is pressed by a hand of the worker gripping it against the biasing force of the biasing member, and thereby retracted inside the handgrip 34 to take the gripped position.

The gripping detection device 40 comprises a position detector 42 for detecting the position of the gripping detection lever 41. In this embodiment, a microswitch is employed as the position detector 42. The position detector 42 is configured to, when the gripping detection lever 41 is located at the ungripped position, receive no pressure and thereby output an OFF signal, and to, when the gripping detection lever 41 is located at the gripped position, receive pressure and thereby output an ON signal. When a worker does not grip the handgrip 34 of the rear handle 33, the gripping detection lever 41 is protruded upwardly from the handgrip 34 and located at the ungripped position, so that the position detector 42 is not pressed by the gripping detection lever 41. Thus, the position detector 42 detects that the gripping detection lever 41 is located at the ungripped position, and then outputs the OFF signal. In this way, the gripping detection device 40 detects that the handgrip 34 is not gripped. When a worker grips the handgrip 34 of the rear handle 33, the gripping detection lever 41 is retracted inside the handgrip 34 to take the gripped position, so that the position detector 42 is pressed by the gripping detection lever 41. Thus, the position detector 42 detects that the gripping detection lever 41 is located at the gripped position, and then outputs the ON signal. In this way, the gripping detection device 40 detects that the handgrip 34 is gripped.

As depicted in FIG. 1 and FIG. 2, a main power switch 50 is provided in a top of the rear portion of the housing 11. The main power switch 50 is provided electrically between the battery pack 22 serving as an electric power supply, and the electric motor 21, and is operable to switch between an ON state for enabling electric power feeding from the battery pack 22 to the electric motor 21, and an OFF state for disabling the electric power feeding from the battery pack 22 to the electric motor 21. Specifically, when the main power switch 50 being in the OFF state is pressed and switched to the ON state, the electric motor 21 is enabled to operate in an output according to the swinging angle at which the trigger lever 35 is pulled, and the saw chain 25 is endlessly moved along the outer periphery of the guide bar 23 at a speed according to the output of the electric motor 21. When the main power switch 50 being in the ON state is re-pressed and switched to the OFF state, the electric motor 21 is disabled to operate even if the trigger lever 35 is pulled. The main power switch 50 is provided with a lamp 50a. The lamp 50a is configured to be turned on when the main power switch 50 is in the ON state.

As depicted in FIG. 2, the chainsaw 10 comprises an interlocking device 60 for control the operation of the electric motor 21 in the chainsaw 10. The interlocking device 60 is connected to the electric motor 21, the main power switch 50, the control signal generator 36 and the position detector 42. The interlocking device 60 is configured to, when the main power switch 50 is the ON state, provide a state for enabling the electric power feeding from the battery pack 22 to the electric motor 21, and, when the main power switch 50 is the OFF state, provide a state for disabling the electric power feeding from the battery pack 22 to the electric motor 21. Further, the interlocking device 60 is configured to, in a state in which the main power switch 50 is switched to the ON state, control an associated system such that the electric motor 21 operates in an output according to the control signal output from the control signal generator 36 when the trigger lever 35 is manipulated. Further, the interlocking device 60 has a control program for, when the trigger lever 35 being in the pulled state is released so as to deactivate the electric motor 21, and the OFF signal is output from the control signal generator 36, in a state in which the position detector 42 of the gripping detection device 40 detects that the handgrip 34 is gripped by a worker, controlling the associated system such that the ON state of the main power switch 50 is maintained, and, when the trigger lever 35 being in the pulled state is released, and the OFF signal is output from the control signal generator 36, in a state in which the position detector 42 of the gripping detection device 40 detects that the handgrip 34 is not gripped by a worker, controlling the associated system such that the ON state of the main power switch 50 is switched to the OFF state thereof, Next, with reference to the flowchart in FIG. 4 describing control processing, the way that the electric motor 21 is controlled by the interlocking device 60 in operation of this chainsaw 10 will be described. In the flow of this control processing, first of all, in step S101, the interlocking device 60 determines whether or not the main power switch 50 has been manipulated to be turned on. Before the main power switch 50 is manipulated to be turned on, the determination in the step S101 is made as NO, and the determination "NO" in the step S101 will be repeated until the main power switch 50 is manipulated to be turned on. When the main power switch 50 is manipulated to be turned on, the determination in the step S101 is made as YES, so that the interlocking device 60 starts to function, and the processing routine proceeds to step S102. In the step S102, the main power switch 50 is switched to the ON state, and the lamp 50a of the main power switch 50 is turned on.

Then, in step S103, it is determined whether or not 5 seconds have elapsed since the switching to the ON state. When 5 seconds have not yet elapsed, the determination is made as NO, and the processing routine proceeds to step S104. In the step S104, it is determined, based on the detection by the gripping detection device 40, whether or not the handgrip 34 has been gripped by a worker, i.e., whether or not the ON signal has been output from the detector 42. When a worker does not grip the handgrip 34, the gripping detection lever 41 is located at the ungripped position, so that the detector 42 is free from being pressed by the gripping detection lever 41, and outputs the OFF signal. Thus, the determination in the step S104 is made as NO, based on the OFF signal of the detector 42, and the processing routine returns to the steps S103. On the other hand, when a worker grips the handgrip 34, the gripping detection lever 41 is pressed by a hand griping the handgrip 34 and moved to the gripped position, so that the position detector 42 is pressed by the gripping detection lever 41, so as to output the ON signal. Thus, the determination in the step S104 is made as YES, based on the ON signal of the detector 42, and the processing routine proceeds to steps S105. In the step S105, it is re-determined whether 5 seconds have elapsed since the main power switch 50 was switched to the ON state. When 5 seconds have not yet elapsed, the processing routine proceeds to step S106. In the step S106, it is determined whether or not an on-manipulation of the trigger lever 35 has been performed, i.e., whether or not the control signal has been output from the control signal generator 36 in accordance with the manipulation of the trigger lever 35. As long as the trigger lever 35 is not pulled by fingers of the hand gripping the handgrip 34, the OFF signal is continuously output from the control signal generator 36. Thus, the determination in the step S106 is made as NO, based on the OFF signal of the control signal generator 36, and the processing routine returns to the step S103. The processings in the above step S103 to S106 will be repeated until 5 seconds elapse since the main power switch 50 was switched to the ON state, while waiting for detection of gripping of the handgrip and the on-manipulation of the trigger lever.

During execution of the processes in steps S103 to S106, when 5 seconds have elapsed since the main power switch 50 was switched to the ON state, before the gripping detection device 40 detects that the handgrip 34 has been gripped, the determination in the step S103 is made as YES, and the processing routine proceeds to step S113. When 5 seconds have elapsed since the main power switch 50 was switched to the ON state, after the gripping detection device 40 detects that the handgrip 34 has been gripped, the determination in the step S105 is made as YES, and the processing routine proceeds to the step S113. In the step S113, the main power switch 50 is switched to the OFF state, and the lamp 50a is turned off, whereafter the processing routine returns to the step S101. On the other hand, during execution of the processings in the step S103 to S106, when a worker pulls the trigger lever 35 while gripping the handgrip 34, before 5 seconds elapse since the main power switch 50 was switched to the ON state, the detector 42 of the gripping detection device 40 is pressed by the gripping detection lever 41 and thereby outputs the ON signal, and the control signal generator 36 outputs the control signal in accordance with the manipulation of the trigger lever 35. That is, the determination in the step S103 and the determination in the step S104 are made, respectively, as NO and YES, and the determination in the step S105 and the determination in the step S106 are made, respectively, as NO and YES, whereafter the processing routine proceeds to step S107. As just described, the interlocking device is programmed such that the main power switch 50 is switched to the OFF state, unless the handgrip is gripped within a given time of 5 seconds, since the main power switch 50 was switched to the ON state, and the on-manipulation of the trigger lever 35 is performed to cause the control signal generator 36 to output the control signal therefrom. In a chain comprising the interlocking device programmed as above, the main power switch 50 is automatically switched to the OFF state unless the handgrip 34 is gripped and the trigger lever 35 is manipulated, within a short period of time since the main power switch 50 was switched to the ON state, so that only a worker who manipulated the main power switch 50 so as to switch it to the ON state can activate the electric motor 21.

Subsequently, in the step S107, the interlocking device 60 operates the electric motor 21 in an output according to the control signal of the control signal generator 36 when the trigger lever 35 is manipulated. The sprocket 24 fixed to the drive shaft 21*a* is rotated according to the operation of the electric motor 21, and the saw chain 25 is endlessly moved along the outer periphery of the guide bar 23, by the sprocket 24 rotated under driving of the electric motor 21. In step S108, it is determined whether or not the main power switch 50 is re-pressed, i.e., manipulated to be turned off. When the main power switch 50 is manipulated to be turned off, the determination in the step S108 is made as YES, and the processing routine proceeds to step S109. In the step S109, the electric motor 21 is deactivated. Then, in the same manner as described above, in the step S113, the main power switch 50 is switched to the OFF state, and the processing routine returns to the step S101. On the other hand, when the main power switch 50 is not manipulated to be turned off, the determination in the step S108 is made as NO, and the processing routine proceeds to step S110. In the step S110, it is determined whether or not the on-manipulation of the trigger lever 35 is performed. When the on-manipulation of the trigger lever 35 is continuously performed, the control signal for operating the electric motor 21 is continuously output from the control signal generator 36. Thus, the determination in the step S110 is made as YES, and the processing routine returns to the step S107, whereby the operation of the electric motor 21 is continued.

During execution of the processings in the steps S107, S108 and S110, when the worker temporarily returns the trigger lever 35 to stop work, the control signal generator 36 outputs the OFF signal. Thus, the determination in the step S110 is made as NO, based on the OFF signal of the control signal generator 36, and the processing routine proceeds to the step S111. In the step S111, the electric motor 21 is deactivated, and the processing routine proceeds to the step S112. In the step S112, it is determined whether or not the handgrip 34 is continuously gripped by the worker, i.e., whether or not the ON signal is output from the position detector 42 of the grippping detection device 40. In the case where the worker just returns the trigger lever 35 temporarily, while keeping gripping the handgrip 34, the gripping detection lever 41 is maintained at the gripped position without any change, so that the position detector 42 continues to output the ON state. Thus, the determination in the step S112 is made as YES, based on the ON signal of the position detector 42, and the processing routine returned to the step S110. As long as the handgrip 34 is gripped, the processings in the steps S110 to S112 will be repeatedly executed until the on-manipulation of the trigger lever 35 is performed. When the on-manipulation of the trigger lever 35 is performed to enable the control signal generator 36 to output therefrom the control signal for operating the electric motor 21, the determination in the step S110 is made as YES, and the processing routine returns to the step S107. Thus, the electric motor 21 is re-activated to endlessly move the saw chain 25.

On the other hand, when the worker places the chainsaw 10 on a mounting table or the like and disengages the hand from the handgrip 34, just like when he/she releases the trigger lever to finish work, the gripping detection lever 41 is returned to the ungripped position by the biasing member, and therefore the position detector 42 becomes free from being pressed by the gripping detection lever 41, to thereby output the OFF signal. Thus, the determination in the step S112 is made as NO, based on the OFF signal of the position detector 42, and the processing routine proceeds to the step S113. In the step S113, the main power switch 50 is switched to the OFF state, and the processing routine returns to the step S101, in the same manner as described above.

As just described, the interlocking device performs control such that the main power switch 50 is switched to the OFF state (the step S113), when the position detector 42 of the gripping detection device 40 detects that the handgrip 34 is not gripped by a worker (NO in the step S112), in a situation where the trigger lever 35 being in a pulled state is released (NO in the step S110), and the OFF signal is output from the control signal generator 36 to deactivate the electric motor 21. In this configuration, even in a situation where a worker unintendedly pulls the trigger lever 34 by fingers of his/her hand gripping the handgrip 34 when he/she re-grips the handgrip 34 after disengaging the hand from the handgrip 34 to finish work once, the electric motor 21 is never activated, so that enhanced safety could be obtained.

On the other hand, the interlocking device 60 operates to maintain the main power switch 50 in the ON state, instead of switching the main power switch 50 to the OFF state, when the position detector 42 of the gripping detection device 40 detects that the handgrip 34 is gripped by a worker (YES in the step S112), in a situation where the trigger lever 35 being in a pulled state is released (NO in the step S110), and the OFF signal is output from the control signal generator 36 to deactivate the electric motor 21. Thus, in the case where a worker keeps gripping the handgrip with the intent to continue work, he/she can re-activate the electric motor 21 simply by re-performing the turn-on manipulation of pulling the trigger lever 35, without a need for the worker to re-manipulate the main power switch 50 to switch it to the ON state. Therefore, the chainsaw according to this embodiment has enhanced safety without deterioration in usability.

The position detector 42 of the gripping detection device 40 of the chainsaw 10 configured as above is not limited to a microswitch. For example, as the position detector 42, it is possible to use a proximity sensor such as a reed switch. In this case, whether or not the handgrip 34 is gripped by a worker may be detected by detecting whether or not a detection target member such as a magnet provided in the gripping detection lever 41 approaches the gripped position or the ungripped position.

Figure 5:
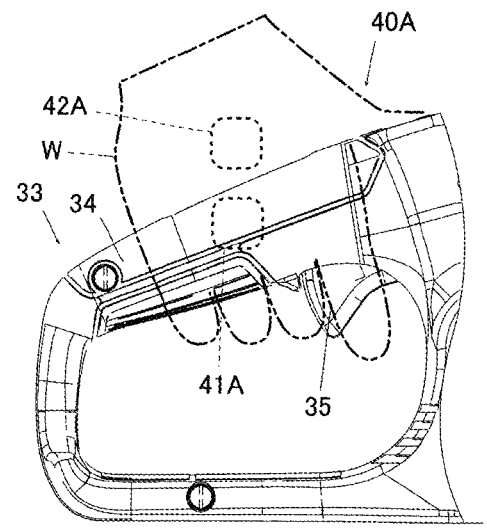
FIG. 5 is an enlarged right side view depicting a rear handle section of the chainsaw depicted in FIG. 2, with one modification of the gripping detection lever.

Further, as depicted in FIG. 5, the gripping detection device may be another type of gripping detection device 40A. The gripping detection device 40A comprises a set of a transmitter 41A and a receiver 42A, for example, utilizing short-range wireless communication techniques. The transmitter 41A is provided in the handgrip 34, and the receiver 42A is provided in a worn article W worn by a hand of a worker, such as a glove or a wristband, wherein the receiver 42A has a coverage capable of receiving a signal transmitted from the transmitter 41A when the worker grips the handgrip 34 and incapable of receiving the signal transmitted from the transmitter 41A when the worker disengages the hand from the handgrip 34. Whether or not the handgrip 34 is gripped by a worker is detected depending on whether the receiver 42A has received the signal transmitted from the transmitter 41A. Alternatively, the receiver 42A and the transmitter 41A may be provided, respectively, in the handgrip 34 and the worn article W. In this gripping detection device 40A, the receiver 42A (or the transmitter 41A) is provided in the worn article W of a worker. Thus, even if a worker who does not have the receiver 42A (or the transmitter 41A) other than a specific worker who has the receiver 42A (or the transmitter 41A) pulls the trigger lever, the electric more 21 is never activated, so that it is possible to restrict usage of the chainsaw by any unintended person other than the specific worker.

Figure 6:
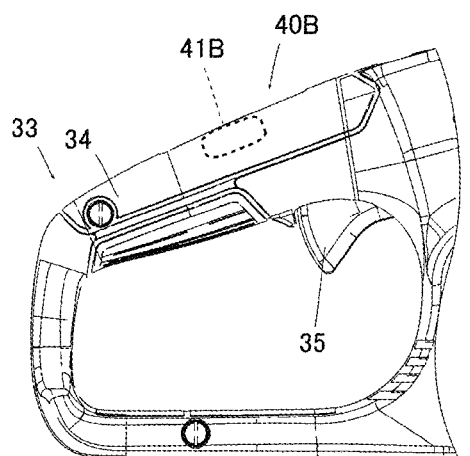
FIG. 6 is an enlarged right side view depicting the rear handle section of the chainsaw depicted in FIG. 2, with another modification of the gripping detection lever.

As depicted in FIG. 6, the gripping detection device may be yet another type of gripping detection device 40B. As one example, the gripping detection device 40B in FIG. 6 comprises a light detector 41B provided in the handgrip 34. Whether or not the handgrip 34 is gripped by a worker is detected by detecting whether or not the light detector 41B is covered by a hand of the worker gripping the handgrip 34 to thereby cause light from surroundings to be blocked.

Figure 7:
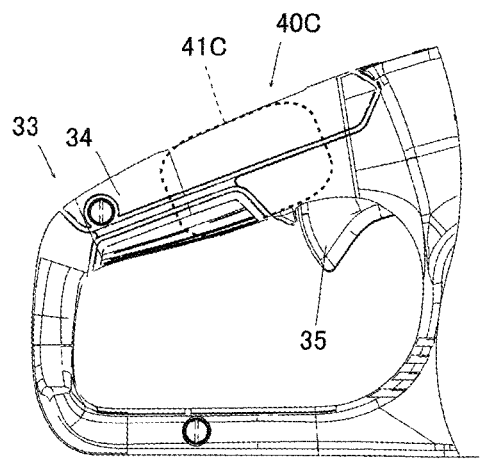
FIG. 7 is an enlarged right side view depicting the rear handle section of the chainsaw depicted in FIG. 2, with yet another modification of the gripping detection lever.

As depicted in FIG. 7, the gripping detection device may be still another type of gripping detection device 40C. As one example, the gripping detection device 40C in FIG. 7 comprises a pressure-sensitive detector 41C, such as a pressure-sensitive electroconductive elastomer, provided, for example, on an outer periphery of the handgrip 34 and operable to detect a change in pressure by a gripping force of a worker when the worker grips the handgrip 34. Whether or not the handgrip 34 is gripped by a worker is detected by detecting whether or not the pressure-sensitive detector 41C has detected the pressure change caused by the gripping force of the worker griping the handgrip 34.

Second Embodiment

Figure 8:
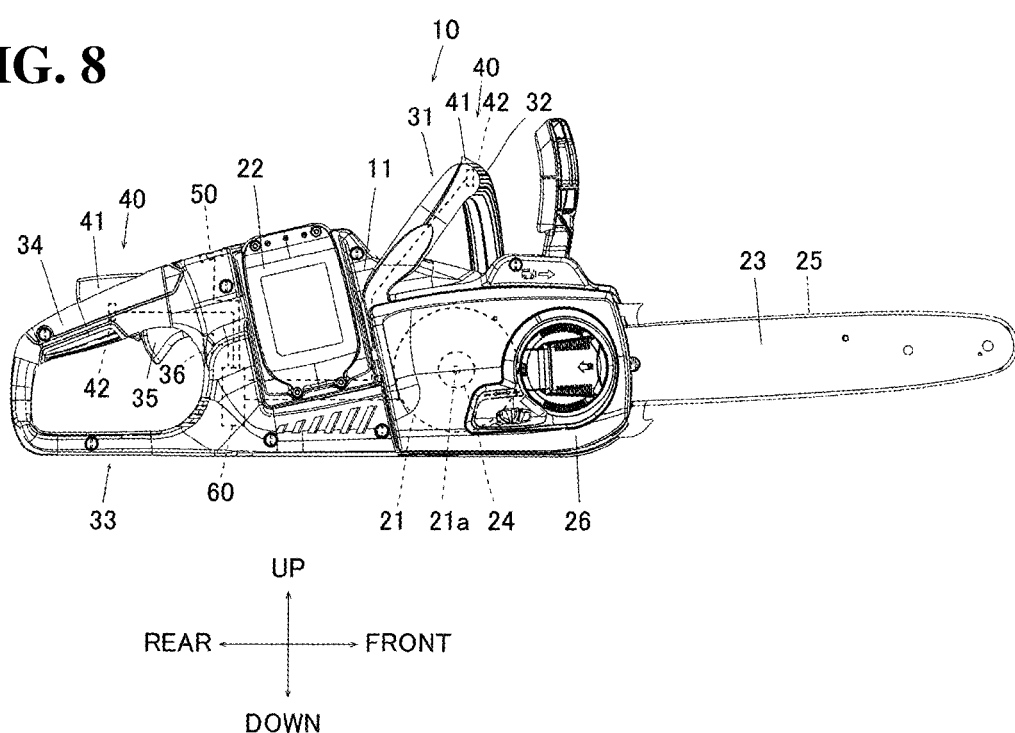
FIG. 8 is a right side view of a chainsaw according to a second embodiment of the present invention.

FIG. 8 depicts a chain saw according to a second embodiment of the present invention. Except that the gripping detection device 40 is additionally provided in the handgrip 32 of the side hand 31 in the chainsaw 10 according to the first embodiment, the chainsaw according to the second embodiment has the same structure as that of the chainsaw 10 according to the first embodiment.

Figure 4:
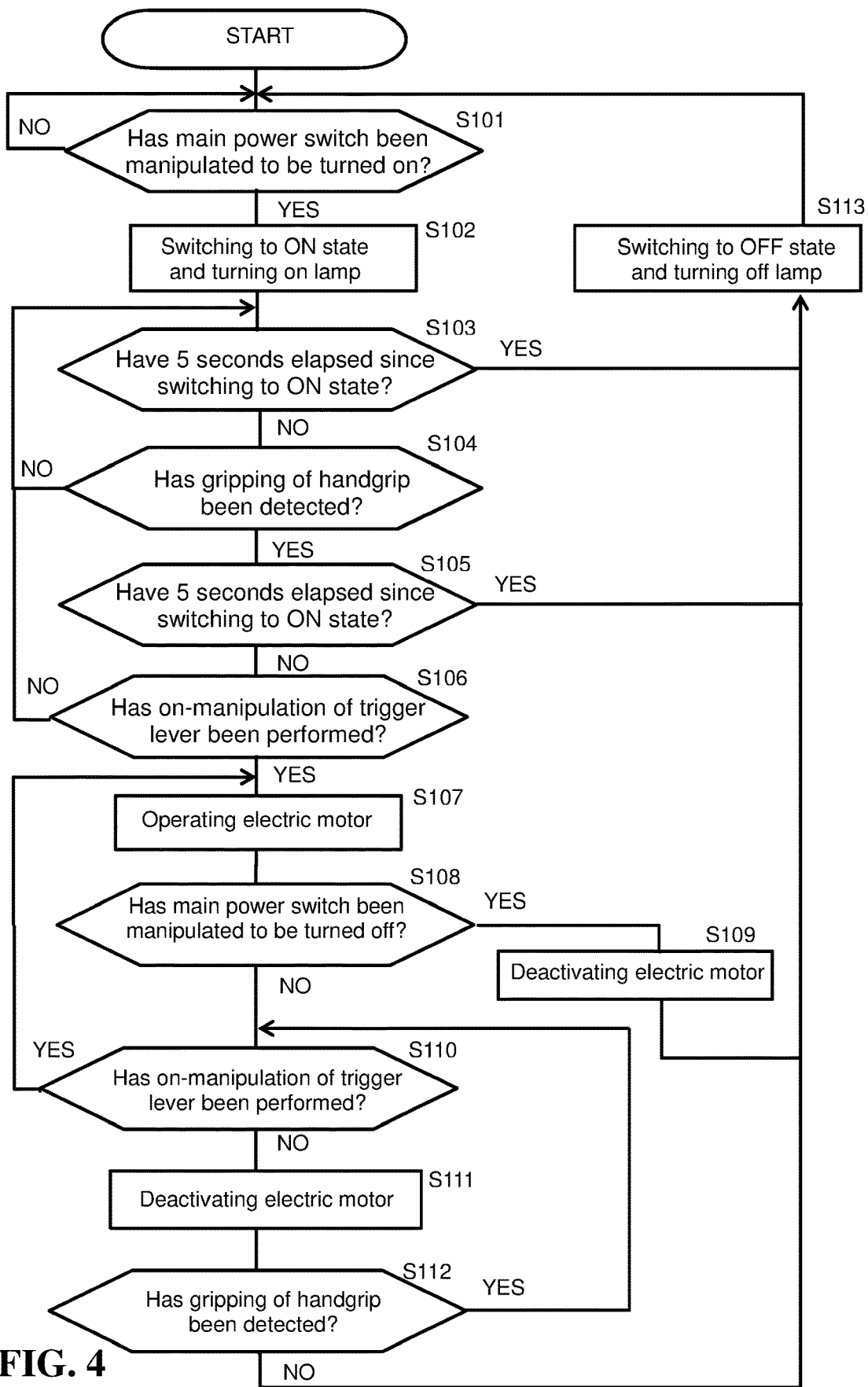
FIG. 4 is a flowchart depicting a flow of processing in an interlocking device.

An interlocking device 60 of the chainsaw 10 according to the second embodiment is configured to control an electric motor 21 in the same manner as that in the flowchart in FIG. 4 described in connection with the first embodiment, wherein in the step S104 and the step S112, a gripping detection device 40 determines whether or not handgrips 32, 34 are gripped by a worker, based on detections of both of a gripping detection device 40 of the handgrip 32 provided in a side handle (first handle) 31, and a gripping detection device 40 of the handgrip 34 provided in a rear handle (second handle) 33 (These gripping detection devices will hereinafter be also referred to as "the two gripping detection devices 40").

In the chainsaw according to the second embodiment, when driving of the electric motor 21 is started after a main power switch 50 is switched to an ON state, the interlocking device 60 performs control such that the electric motor 21 is activated when an on-manipulation of a trigger lever 35 is performed (YES in the step S106) in a state in which each of the two gripping detection devices 40 detects that a corresponding one of the handgrips 32, 34 is gripped (YES in the step S104). In this configuration, the operation of the electric motor 21 cannot be started unless a worker grips the handgrip 32 of the side handle 31 and the handgrip 34 of the rear handle 33, respectively, with both of right and left hands of the worker, so that it is possible to prompt the worker to grip both of the the handgrips 32, 34 of the side handle 31 and the rear handle 33 with both hands of the worker. This makes it possible to allow a worker to use the chainsaw 10 with high safety Further, in the chainsaw 10 according to the second embodiment, the interlocking device 60 performs control to switch the main power switch 50 to an OFF state (the step 113), when the trigger lever 35 being in a pulled state is released to enable a control signal generator 36 to output an OFF signal to deactivate the electric motor 21 (NO in the step S110), in a state in which at least one of the gripping detection device 40 of the handgrip 32 of the side handle 31 and the gripping detection device 40 of the handgrip 34 of the rear handle 33 detects that a corresponding one of the handgrips 32, 34 of the side handle 31 and the rear handle 33 is not gripped by a worker (NO in the step S112), and to prevent the main power switch 50 from being switched to the OFF state, when the trigger lever 35 being in the pulled state is released to enable the control signal generator 36 to output the OFF signal to deactivate the electric motor 21 (NO in the step S110), in a state in which each of the two gripping detection devices 40 detects that a corresponding one of the handgrips 32, 34 is gripped by a worker (YES in the step S112).

In the chainsaw 10 configured as above, unless a worker grips both of the handgrips of the side handle 31 and the rear handle 33 with both of right and left hands, when the trigger lever 35 is manipulated to deactivate the electric motor 21, the electric motor 21 is not activated even when the on-manipulation of the trigger lever 35 is re-performed, so that it is possible to prompt the worker to grip both of the handgrips of the side handle 31 and the rear handle 33 with both of right and left hands. Thus, it becomes possible to allow the user to use the chainsaw 10 with high safety.

The chainsaw according to the second embodiment may also employ any of the gripping detection devices 40A to 40C presented as modifications of the first embodiment. In this case, it is possible to obtain the same functions/advantageous effects as described above.

Although the chainsaw 10 according to each of the above embodiments is a rear handle-type chainsaw comprising a side handle 31 on a longitudinally intermediate portion of a housing 11, and a rear handle 33 on a rear portion of the housing 11, the present invention is not limited thereto, but may be a top handle-type chainsaw comprising a side handle on a longitudinally intermediate portion of a housing 11, and a top handle on an upper portion of the housing 11. The invention of this application can provide the same functions/ advantageous effects as described above in the top handle-type chainsaw.

Although the chainsaw 10 according to each of the above embodiments uses the battery pack 22 as an electric power supply for the electric motor 21, the present invention is not limited thereto, but can be applied to a chain saw in which the electric motor 21 is connected to an external electric power supply (domestic or industrial AC power supply). In such a chainsaw, it is possible to obtain the same functions/ advantageous effects as described above.

Although the chainsaw 10 according to each of the above embodiments uses the trigger lever 35 as a manipulation element of a control unit, the present invention is not limited thereto, but a manipulation button, a manipulation dial or the like may be used as the manipulation element. In such a chainsaw, it is possible to obtain the same functions/advantageous effects as described above.

The invention claimed is:

1. A chainsaw comprising:
   a housing;

at least one handle coupled to the housing, the at least one handle including a handgrip to be gripped by a worker using the chainsaw;

a guide bar coupled to the housing in such a manner as to protrude forwardly from the housing, the guide bar formed in an elongate plate shape having an outer periphery;

a saw chain slidably provided around the outer periphery of the guide bar in such a manner as to be endlessly moved along the outer periphery;

an electric motor provided inside the housing and operable to endlessly move the saw chain;

an electric power supply;

a main power switch provided electrically between the electric power supply and the electric motor, the main power switch being switchable between an ON state for enabling electric power feeding from the electric power supply to the electric motor, and an OFF state for disabling the electric power feeding;

a trigger for controlling the electric power feeding from the electric power supply to the electric motor in a state in which the main power switch is switched to the ON state, to thereby control rotation of the electric motor;

at least one detector provided in the handgrip and operable to detect whether or not the handgrip is gripped by the worker; and an interlocking device associated with the electric motor, the main power switch, the trigger and the detector, the interlocking device being configured to, when the trigger is manipulated to stop the rotation of the electric motor in a state in which the detector detects that the handgrip is gripped by the worker, maintain the ON state of the main power switch, and to, when the trigger is manipulated to stop the rotation of the electric motor in a state in which the detector detects that the handgrip is not gripped by the worker, switch the ON state of the main power switch to the OFF state.

2. The chainsaw as recited in claim 1, wherein the at least one handle comprises a first handle and a second handle, and the at least one detector comprises a first detector and a second detector;

the first handle having a first handgrip to be gripped by one hand of the worker using the chainsaw, the second handle having a second handgrip to be gripped by the other hand of the worker using the chainsaw, the first handgrip being provided with the first detector operable to detect whether the first handgrip is gripped by the worker, the second handgrip being provided with the second detector operable to detect whether or not the second handgrip is gripped by the worker, and the interlocking device is configured to, when the trigger is manipulated to stop the rotation of the electric motor in a state in which each of the first detector and the second detector detects that a corresponding one of the first handgrip and the second handgrip is gripped by the worker, maintain the main power switch in the ON state, and to, when the trigger is manipulated to stop the rotation of the electric motor in a state in which at least one of the first detector and the second detector detects that a corresponding one of the first handgrip and the second handgrip is not gripped by the worker, switch the main power switch to the OFF state.

3. The chainsaw as recited in claim 2, wherein the first detector or the second detector comprises:

a gripping detection member configured to be protruded from the handgrip to take an ungripped position when the handgrip is not gripped by the worker, and to be retracted inside the handgrip to take a gripped position when the handgrip is gripped by the worker; and a position detector operable to detect whether the gripping detection member is located at the ungripped position or at the gripped position, wherein the first detector or the second detector is configured to detect whether or not the handgrip is gripped by the worker, depending on whether the position detector detects that the gripping detection member is located at the gripped position or that the gripping detection member is located at the ungripped position.

4. The chainsaw as recited in claim 2, wherein the first detector or the second detector comprises a transmitter provided in one of the handgrip and a worn article worn on a hand of the worker, and a receiver provided in the other of the handgrip and the worn article, the receiver being capable of receiving a signal transmitted from the transmitter, when the worker grips the handgrip, and wherein the first detector or the second detector is configured to detect whether or not the handgrip is gripped by the worker, depending on whether or not the receiver has received the signal transmitted from the transmitter.

5. The chainsaw as recited in claim 2, wherein the first detector or the second detector comprises a light detector provided in the handgrip and operable to detect light from surroundings, the light detector being operable to detect whether or not the light detector is covered by a hand of the worker to thereby cause light from the surroundings to be blocked, and wherein the first detector or the second detector is configured to detect whether or not the handgrip is gripped by the worker, depending on whether or not light from the surroundings has been blocked.

6. The chainsaw as recited in claim 2, wherein the first detector or the second detector comprises a pressure-sensitive detector provided in the handgrip and operable to detect a change in pressure applied to the handgrip when the handgrip is gripped by the worker, and wherein the first detector or the second detector is configured to detect whether or not the handgrip is gripped by the worker, depending on whether or not the pressure-sensitive detector has detected the pressure change.

7. The chainsaw as recited in claim 1, wherein the detector comprises:

a gripping detection member configured to be protruded from the handgrip to take an ungripped position when the handgrip is not gripped by the worker, and to be retracted inside the handgrip to take a gripped position when the handgrip is gripped by the worker; and a position detector operable to detect whether the gripping detection member is located at the ungripped position or at the gripped position, wherein the detector is configured to detect whether or not the handgrip is gripped by the worker, depending on whether the position detector detects that the gripping detection member is located at the gripped position or that the gripping detection member is located at the ungripped position.

8. The chainsaw as recited in claim 1, wherein the detector comprises:

a transmitter provided in one of the handgrip and a worn article worn on a hand of the worker, and a receiver provided in the other of the handgrip and the worn article, the receiver being capable of receiving a signal transmitted from the transmitter, when the worker grips the handgrip, and wherein the detector is configured to detect whether or not the handgrip is gripped by the worker, depending on whether or not the receiver has received the signal transmitted from the transmitter.

9. The chainsaw as recited in claim 1, wherein the detector comprises a light detector provided in the handgrip and operable to detect light from surroundings, the light detector being operable to detect whether or not the light detector is covered by a hand of the worker to thereby cause light from the surroundings to be blocked, and wherein the detector is configured to detect whether or not the handgrip is gripped by the worker, depending on whether or not light from the surroundings has been blocked.

10. The chainsaw as recited in claim 1, wherein the detector comprises a pressure-sensitive detector provided in the handgrip and operable to detect a change in pressure applied to the handgrip when the handgrip is gripped by the worker, and wherein the detector is configured to detect whether or not the handgrip is gripped by the worker, depending on whether or not the pressure-sensitive detector has detected the pressure change.

\* \* \* \* \*